(12) United States Patent
Lin

(10) Patent No.: US 7,274,563 B2
(45) Date of Patent: Sep. 25, 2007

(54) PORTABLE COMPUTER

(75) Inventor: Ke-Cheng Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/114,687

(22) Filed: Apr. 25, 2005

(65) Prior Publication Data

US 2006/0104019 A1   May 18, 2006

(30) Foreign Application Priority Data

Nov. 18, 2004   (CN)   .................. 2004 2 0095594

(51) Int. Cl.
*G06F 1/16*   (2006.01)
(52) U.S. Cl. ..................... 361/683; 361/685
(58) Field of Classification Search ............... 361/681, 361/682, 683, 685
See application file for complete search history.

(56) References Cited

U.S. PATENT DOCUMENTS

| | | | |
|---|---|---|---|
| 5,319,582 A | | 6/1994 | Ma |
| 5,738,536 A | * | 4/1998 | Ohgami et al. ............. 439/142 |
| 5,967,633 A | * | 10/1999 | Jung ....................... 312/223.2 |
| 6,191,942 B1 | | 2/2001 | Lee et al. |
| 6,718,408 B2 | * | 4/2004 | Esterberg et al. ............. 710/62 |
| 6,842,333 B2 | * | 1/2005 | Lee et al. .................. 361/681 |
| 2003/0076652 A1 | * | 4/2003 | Ahn ............................ 361/683 |
| 2004/0042160 A1 | * | 3/2004 | Tang et al. ................. 361/681 |

* cited by examiner

*Primary Examiner*—Jayprakash Gandhi
*Assistant Examiner*—Ingrid Wright
(74) *Attorney, Agent, or Firm*—Wei Te Chung

(57) ABSTRACT

A portable computer includes a chassis, a motherboard (20) and a side cover (42, 44). The motherboard is mounted to the chassis having a plurality of sockets (22, 24). The side cover is mounted to a side of the chassis where the sockets of the motherboard are disposed.

13 Claims, 6 Drawing Sheets

PORTABLE COMPUTER

BACKGROUND OF THE INVENTION

1. Field of the Invention

The present invention relates to portable computers, and particularly to a portable computer which is convenient to receive a motherboard.

2. Background of the Invention

A portable computer usually comprises a motherboard which has a plurality of sockets on edges. Because some sockets are needed to extend beyond the edges of the motherboard, especially the sockets disposed on adjacent edges of the motherboard, some trouble are brought in aligning through holes defined in adjacent side panels of the portable computer with the sockets of the motherboard. The motherboard is thus inconvenient to be assembled in the portable computer.

Referring to FIGS. 6 and 7, a portable computer comprises a base 10', a motherboard 20' and a cover 30' mounted on the base 10'. The base 10' has a bottom panel 12' and a front panel 14', a side panel 18' extending perpendicularly to the bottom panel 12'. A plurality of through holes 142', 182' is defined respectively in the front panel 14' and the side panel 18'. The motherboard 20 has a plurality of sockets 22', 24' on two adjacent edges, corresponding to the through holes 142', 182'. The sockets 22', 24' extend beyond the edges of the motherboard 20'. In assembly, the front panel 14' is elastically bent outwardly under an external force so that the motherboard 20' can be installed in the base 10'. When the socket 22', 24' are aligned with the through holes 142', 182', the external force is withdrawn. The front panel 14' rebounds, and the sockets 22', 24' of the motherboard 20' can pass through the corresponding through holes 142', 182'. The motherboard 20' is then mounted on the base 10' by some screws. The cover 30' is subsequently fastened on the base 10'. In disassembly, the cover 30' is firstly taken down from the base 10', then the screws are removed from the motherboard 20'. The front panel 14' is pushed again to elastically bent outwardly so that the sockets 22', 24' can be apart away from the through holes 142', 182'. The motherboard 20' is thus taken out from the base 10'. It is evident that the front panel 14' should be pushed to bend outwardly during the assembly and disassembly of the motherboard 20'. That is inconvenient to install the motherboard 20' to the portable computer.

What is needed, therefore, is a portable computer convenient to receive a motherboard.

SUMMARY

A portable computer comprises a chassis, a motherboard and a side cover. The motherboard with a plurality of sockets is mounted to the chassis. The side cover is mounted to a side of the chassis where the sockets of the motherboard are disposed.

Other advantages and novel features of the present invention will be drawn from the following detailed description of preferred embodiment with attached drawings, in which:

DETAIL DESCRIPTION OF PREFERRED EMBODIMENT

Figure 1:
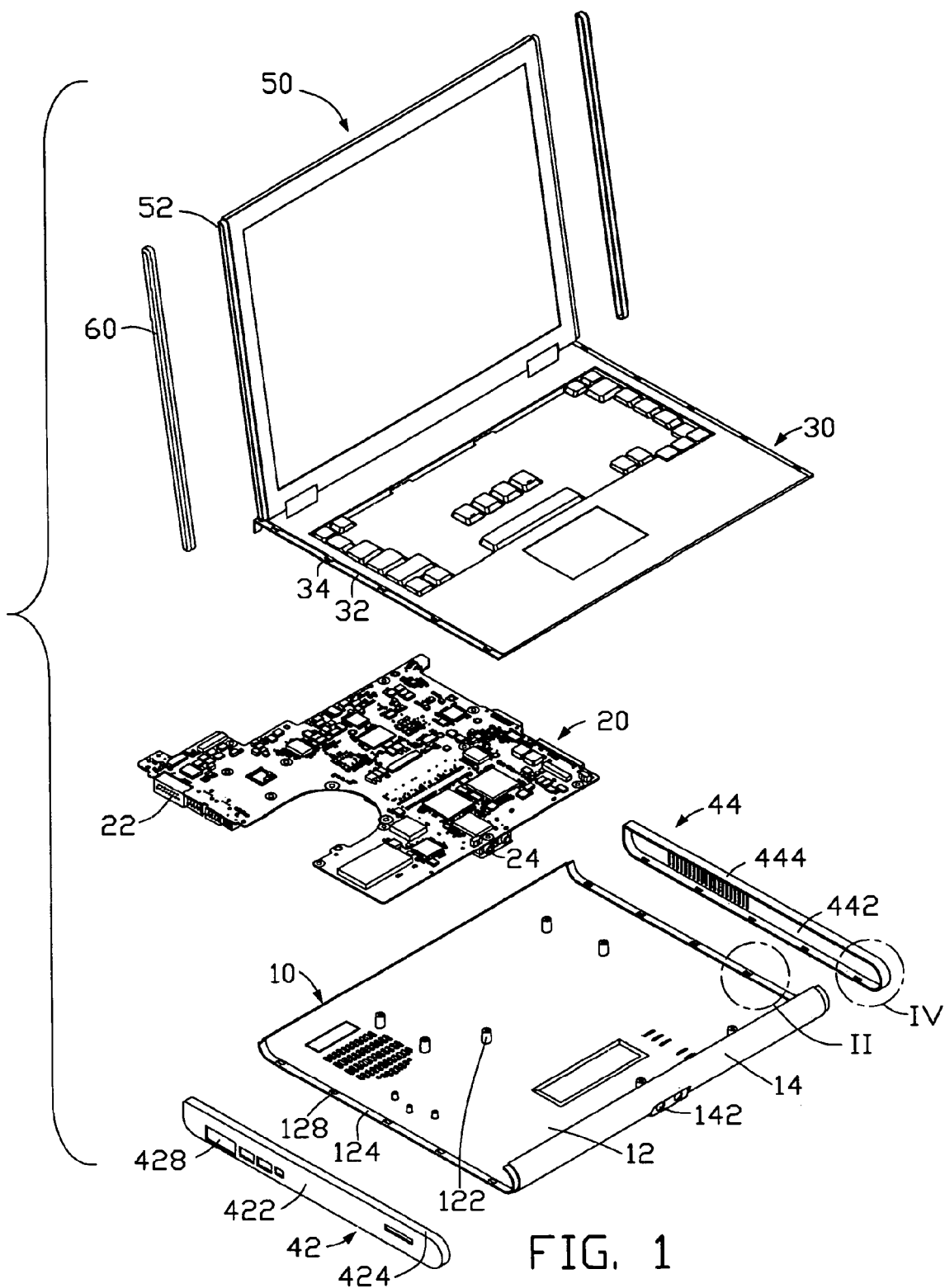
FIG. 1 is an exploded, isometric view of the portable computer in accordance with the preferred embodiment of the present invention, the portable computer comprising a base, a motherboard, a top cover, two pairs of side covers and a Liquid Crystal Display (LCD)
Figure 2:
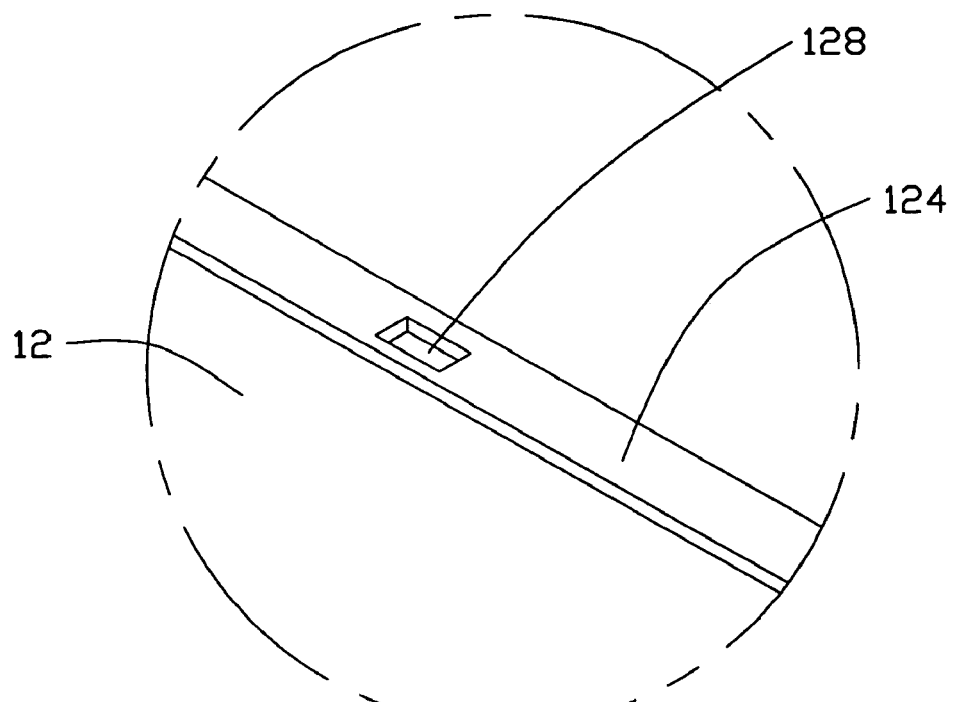
FIG. 2 is an enlarged view of circled portion V of FIG. 1.
Figure 3:
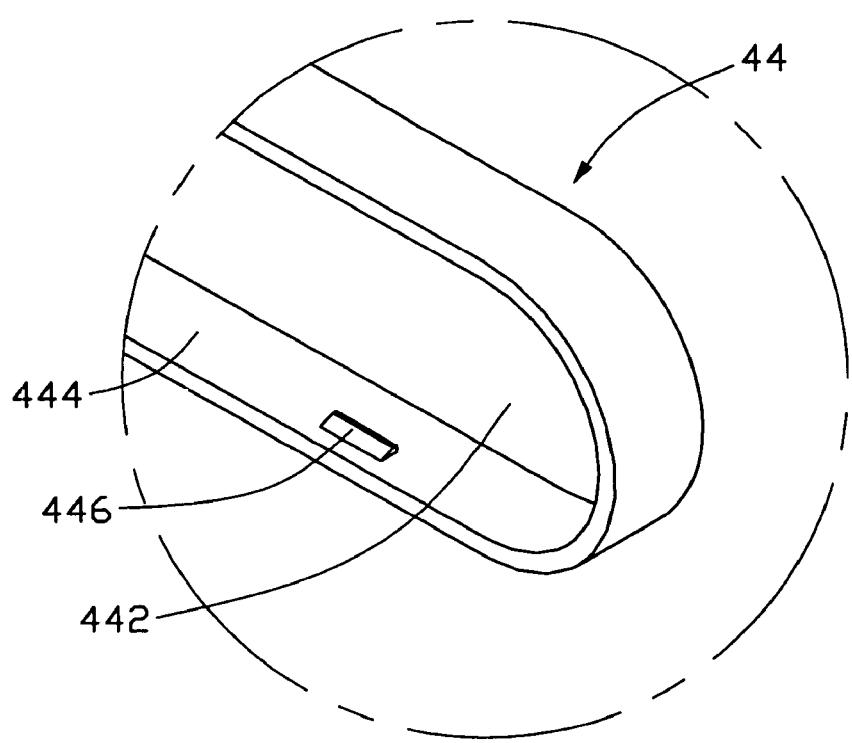
FIG. 3 is an enlarged view of circled portion IV of FIG. 1.
Figure 4:
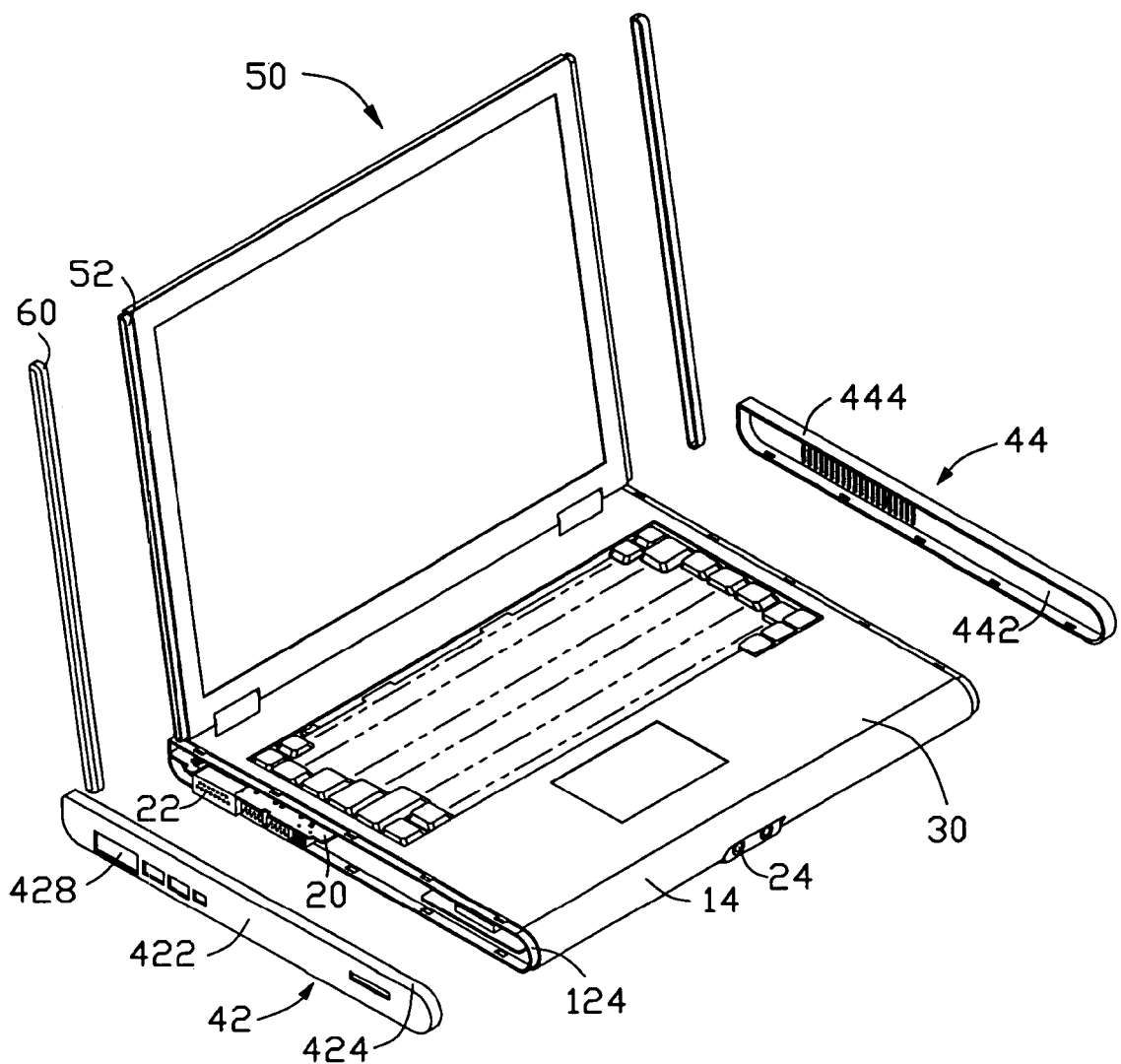
FIG. 4 is an assembled view of FIG. 1, but showing the side covers and the side covers being apart away from the portable computer.
Figure 5:
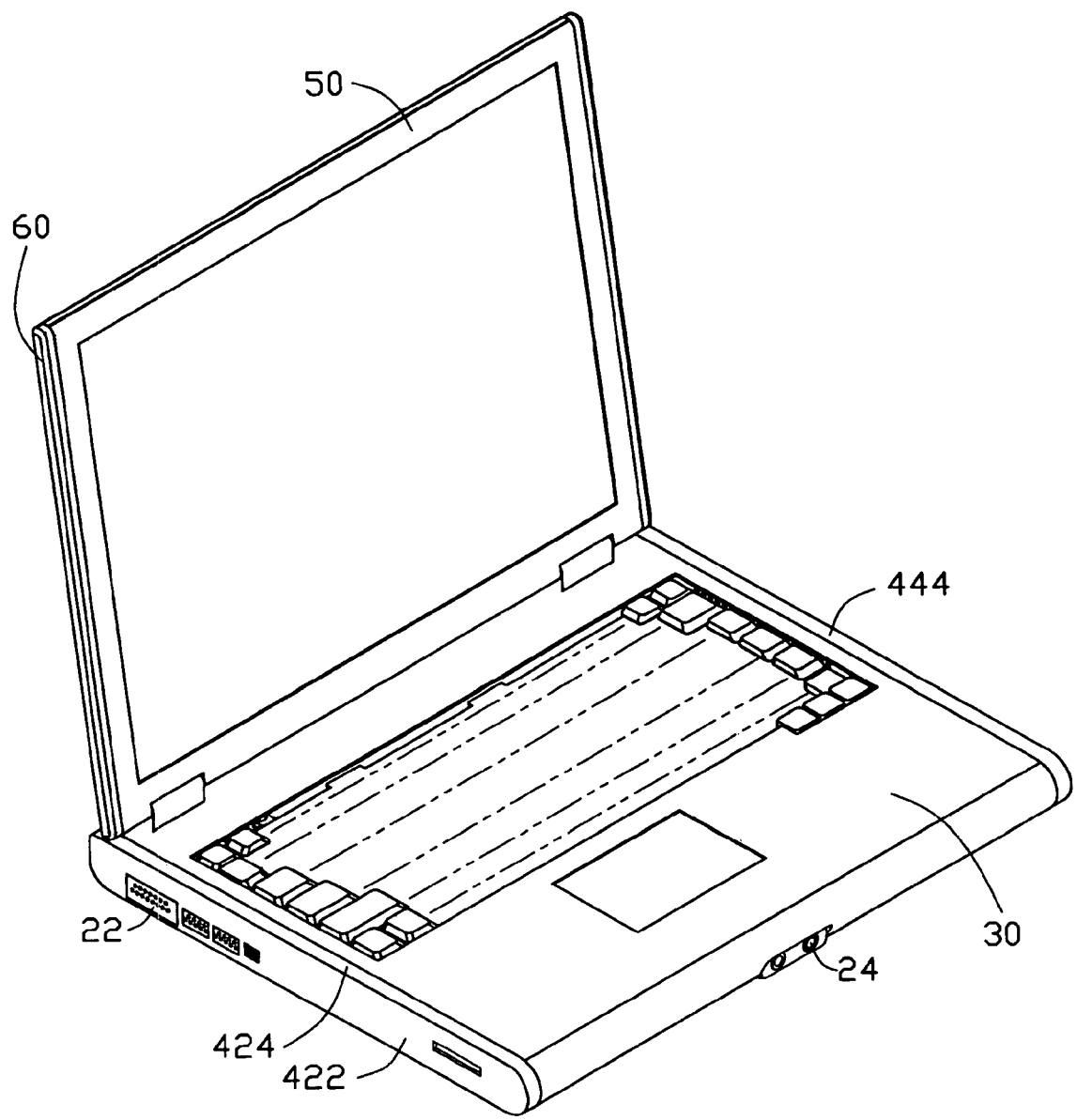
FIG. 5 is an assembled view of FIG. 1.

Referring to FIG. 1, a portable computer comprises a chassis (not labeled), a motherboard 20 and a pair of side covers 42, 44.

The chassis comprises a base 10 and a top cover 30 mounted on the base. The base 10 has a bottom panel 12 and a front panel 14 extending upwardly from the front edge of the bottom panel 12. The front panel 14 defines a plurality of through holes 142 therein. Brims 124, 32 respectively extend from opposite side edges of the base 10 and the top cover 30. The brims 124, 32 define a plurality of mounting holes 128, 34 therein.

The motherboard 20 has a plurality of sockets 22, 24 on two adjacent edges (not labeled) which extends outwardly beyond the edges of the motherboard 20.

The side cover 42 has a base plate 422 and a continuate flange 424 extending perpendicularly from edges of the base plate 42. The base plate 422 defines a plurality of through holes 428 therein, corresponding to the socket 22 of the motherboard 20. A plurality of wedge-shaped protrusions (not shown) corresponding to the mounting holes 128, 34 is protruded from an inner surface of the flange 424. The side cover 44 has a structure similar to the side cover 42 comprising a base plate 442 and a flange 444. The side cover 44 also has a plurality of wedge-shaped protrusions 446 on an inner surface.

Figure 6:
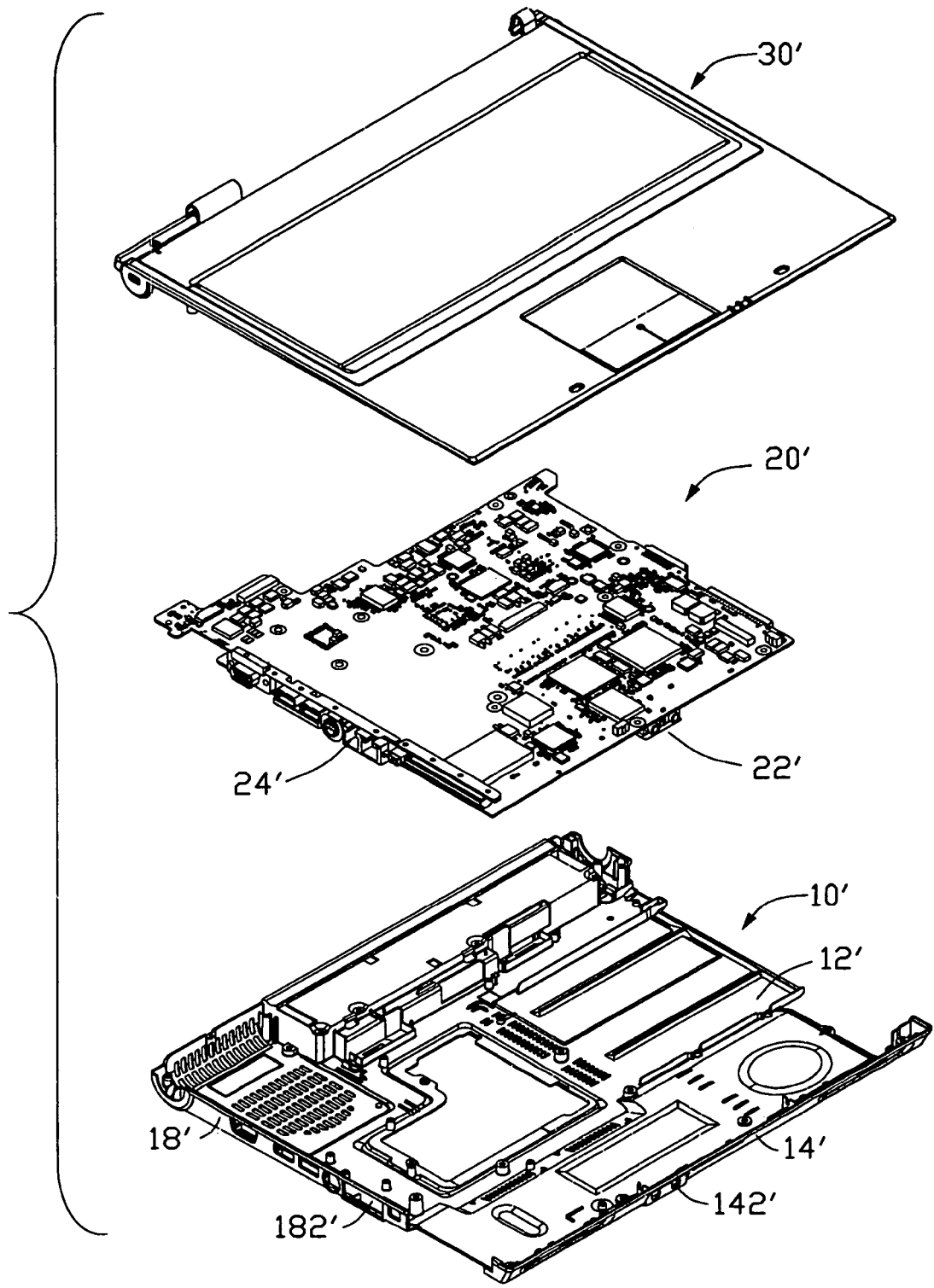
FIG. 6 is an exploded, isometric view of a conventional portable computer.
Figure 7:
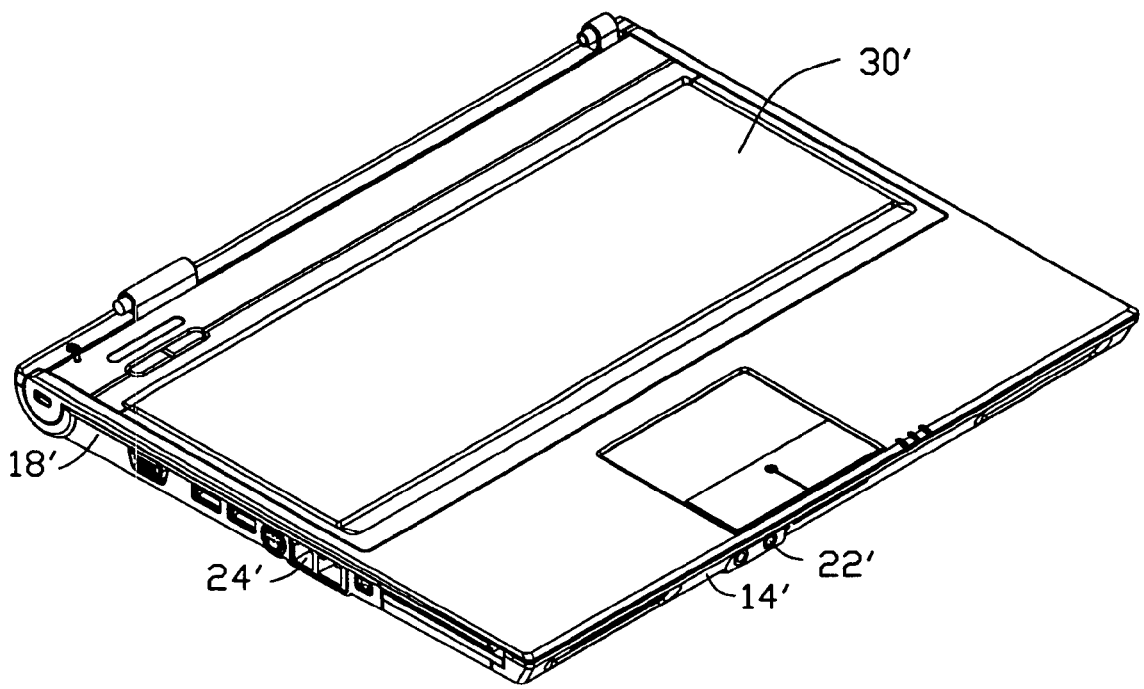
FIG. 7 is an assembled view of FIG. 6.

Referring also to FIGS. 6 and 7, in assembly, the motherboard 20 is disposed on the bottom panel 12 of the base 10, the sockets 24 of the motherboard 20 are inserted into the corresponding through holes 142 of the front panel 14 of the base 10. Then the motherboard 20 is fastened on the bottom panel 12 by some mounting means (not shown), such as some screws. The top cover 30 engages with the base 10 by the protrusions of the side cover 42 and the protrusions 446 of the side cover 44 locking into the corresponding mounting holes 128, 34. The sockets 22 of the motherboard 20 passes through the through holes 429 of the side cover 42. The motherboard 20 is thus mounted in the portable computer.

The portable computer of the invention further comprises a Liquid Crystal Display (LCD) 50 rotatably disposed on the chassis and a pair of side covers 60. The LCD 50 has a pair of brims 52 on opposite side edges. The side covers 60 are mounted on the brims 52 of the LCD 50. When the LCD 50 is closed, the side covers 60 are clung to the side cover 42, 44. A gap between the LCD 50 and the base 10 is so narrow that the gap is not seed from exterior of the portable computer.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A portable computer comprising:
   a chassis comprising a base and a top cover;
   a motherboard mounted to the chassis between the base and the top cover, the motherboard having a plurality of sockets exposable out of the chassis; and
   a side cover detachably mounted to a side of the chassis, the side cover comprising a flange extending away from the side of the chassis and surrounding edges of the base and the top cover in order to confine the base and the top cover to securely abut against each other at the edges thereof;
   wherein the base and the top cover comprise brims extending at the edges of the base and the top cover for mounting the side cover.

2. The portable computer as described in claim 1, wherein the side cover of the portable computer defines a plurality of through holes corresponding to the sockets of the motherboard.

3. The portable computer as described in claim 1, further comprising a Liquid Crystal Display (LCD) and a side cover mounted to a side of the LCD.

4. A portable computer comprising:
   a chassis comprising a base and a top cover; and
   a pair of side covers detachably mounted to opposite sides of the chassis, each of the pair of side covers extending a flange away from the opposite sides toward each other so as to jointly confine the base and the top cover between the pair of side covers and limit movement of the base and the top cover relative to each other along a direction parallel to the opposite sides of the chassis;
   wherein the base and the top cover comprise brims extending from the base and the top cover toward the pair of side covers respectively for mounting the pair of side covers.

5. The portable computer as described in claim 4, further comprising a motherboard, wherein the motherboard is mounted in the chassis, and comprises a plurality of sockets exposable out of the chassis.

6. The portable computer as described in claim 5, wherein at least one of the side covers defines a plurality of through holes corresponding to the sockets of the motherboard.

7. The portable computer as described in claim 4, wherein a plurality of mounting holes is defined in the brims, and a plurality of protrusions is protruded from the side covers for being received in the mounting holes of the brims.

8. The portable computer as described in claim 4, further comprising a Liquid Crystal Display (LCD) and a pair of side covers mounted to opposite sides of the LCD.

9. A portable computer comprising:
   a chassis having a motherboard mounted therein, the chassis having one side integrally forming a panel, and an adjacent side without a panel; and
   a side cover; wherein after the motherboard is assembled to the chassis in a direction perpendicular to the panel, the side cover is detachably mounted to the chassis at said adjacent side in a direction parallel to the panel;
   wherein the chassis further comprises a base and a top cover mounted to the base, the side cover forms a continuous flange to engagingly cover brims of the top cover and the base.

10. The portable computer as described in claim 9, wherein the panel defines a plurality of through holes adapted for receiving sockets of a first side of the motherboard.

11. The portable computer as described in claim 10, wherein the side cover defines a plurality of through holes adapted for receiving sockets of a second side of the motherboard.

12. The portable computer as described in claim 11, wherein the brims of the top cover and the base defines a plurality of mounting holes, the flange forms a plurality of wedge-shaped protrusions to engage in the mounting holes.

13. The portable computer as described in claim 1, wherein the side cover comprises a base plate and the flange extending continuously from edges of the base plate, the brims continuously extend from the base and the top cover and are offset from the base and the top cover, and the flange engagingly covers the brims of the base and the top cover.

* * * * *